United States Patent
Qi et al.

(10) Patent No.: US 10,705,355 B2
(45) Date of Patent: Jul. 7, 2020

(54) OPTICAL APPARATUS

(71) Applicants: Sintai Optical (Shenzhen) Co., Ltd., ShenZhen, Guangdong (CN); Asia Optical Co., Inc., Taichung (TW)

(72) Inventors: Xue-Qing Qi, ShenZhen (CN); Jia-Hong He, ShenZhen (CN)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 7 days.

(21) Appl. No.: 15/653,619

(22) Filed: Jul. 19, 2017

(65) Prior Publication Data
US 2018/0101033 A1 Apr. 12, 2018

(30) Foreign Application Priority Data
Oct. 8, 2016 (CN) .......................... 2016 1 0882521

(51) Int. Cl.
| G02B 3/00 | (2006.01) |
| G02F 1/03 | (2006.01) |
| G02B 23/20 | (2006.01) |
| G02B 23/10 | (2006.01) |
| G02B 13/06 | (2006.01) |
| H04N 5/262 | (2006.01) |
| G02F 1/35 | (2006.01) |

(52) U.S. Cl.
CPC ............ G02F 1/0311 (2013.01); G02B 13/06 (2013.01); G02B 23/105 (2013.01); G02B 23/20 (2013.01); H04N 5/2628 (2013.01); G02F 1/3519 (2013.01); G02F 2201/56 (2013.01)

(58) Field of Classification Search
CPC ...................................................... G02F 1/0311
USPC ........................................................ 359/662
See application file for complete search history.

(56) References Cited

U.S. PATENT DOCUMENTS

| 5,577,326 | A * | 11/1996 | Montelin .................. F41G 1/16 356/251 |
| 5,577,329 | A | 11/1996 | Montelin |
| 7,303,290 | B2 | 12/2007 | Wittenberg et al. |
| 7,585,089 | B2 | 9/2009 | Swantner et al. |
| 9,778,452 | B2 | 10/2017 | Mochinushi |
| 2016/0223806 | A1* | 8/2016 | Mochinushi ........... G02B 23/14 |

FOREIGN PATENT DOCUMENTS

| CN | 101258441 A | 9/2008 |
| CN | 105842838 A | 8/2016 |
| JP | 8504029 A | 4/1996 |
| TW | M358325 U | 6/2009 |

\* cited by examiner

*Primary Examiner* — James C Jones
(74) *Attorney, Agent, or Firm* — McClure, Qualey & Rodack, LLP

(57) ABSTRACT

An optical apparatus includes a main body, a reflecting object lens pivotally connected to the main body and a cover pivotally connected to the reflecting object lens. The reflecting object lens is rotatable with respect to the main body within a first angle, and the cover is rotatable with respect to the reflecting object lens within a second angle.

20 Claims, 10 Drawing Sheets

OPTICAL APPARATUS

BACKGROUND OF THE INVENTION

Field of the Invention

The invention relates to an optical apparatus, and more particularly to a dot sight.

Description of the Related Art

FIG. 1 depicts the structure of a prior optical apparatus. The prior optical apparatus 10 includes a main body 100, a cover 101, a reflecting object lens 102 and a connecting rod structure 103. The main body 100 includes a switch 130 disposed thereon. When the switch 130 is toggled, both the cover 101 and the reflecting object lens 102 are raised so that the optical apparatus 10 comes to an opening state as shown in FIG. 1. In contrast to the opening state, the cover 101 is pushed down to the main body 100 for accommodating the reflecting object lens 102 in an enclosed space formed between the cover 101 and the main body 100 so that the optical apparatus 10 comes to a closed state.

However, the main body 100, the cover 101 and the connecting rod structure 103 are connected through a plurality of screws 110. Therefore, assembling the prior optical apparatus 10 which has a quite number of components is labor-consuming and the manufacturing cost is high.

BRIEF SUMMARY OF THE INVENTION

The invention provides an optical apparatus. The cover is pivotally connected to the reflecting object lens for substituting the screws and the connecting rod structure which connect the cover to the main body, so the structure and the component of the optical apparatus are simplified.

The optical apparatus in accordance with an embodiment of the invention includes a main body, a reflecting object lens pivotally connected to the main body and a cover pivotally connected to the reflecting object lens. The reflecting object lens is rotatable with respect to the main body within a first angle, and the cover is rotatable with respect to the reflecting object lens within a second angle.

In another embodiment, the optical apparatus further includes a pivot. The reflecting object lens is pivotally connected to the main body through the pivot.

In yet another embodiment, the optical apparatus further includes a pivot. The cover is pivotally connected to the reflecting object lens through the pivot.

In another embodiment, the optical apparatus further includes an elastic element disposed on the pivot. The elastic element is deformed with an elastic force generated and stored therein when the optical apparatus is closed, and the elastic force is released when the optical apparatus is opened.

In yet another embodiment, the elastic element is a torsion spring or a flat spring.

In another embodiment, the optical apparatus further includes an elastic element disposed on the pivot. The elastic element is deformed with an elastic force generated and stored therein when the optical apparatus is closed, and the elastic force is released when the optical apparatus is opened.

In yet another embodiment, the elastic element is a torsion spring or a flat spring.

In another embodiment, the main body includes a switch and a linkage structure. The switch includes a first inclined plane. The linkage structure includes a first hook, a second hook and a second inclined plane. The first inclined plane is placed against the second inclined plane. The first inclined plane slides with respect to the second inclined plane to move the linkage structure when the switch is operated.

In yet another embodiment, the reflecting object lens further includes a third hook configured to detachably connect to the first hook.

In another embodiment, the cover further includes a third hook configured to detachably connect to the second hook.

In yet another embodiment, the optical apparatus further includes a light source and a reflecting mirror. The light source is configured to produce a first light beam, and the reflecting mirror is configured to reflect the first light beam to the reflecting object lens.

In another embodiment, the optical apparatus further includes a mask. The mask includes at least one transparent portion, and the first light beam passes through the transparent portion to be shaped.

In yet another embodiment, the transparent portion is in a shape of reticle, crosshair, target dot, or circle.

The optical apparatus in accordance with another embodiment of the invention includes a main body, a reflecting object lens pivotally connected to the main body, a light source, and a mask. The reflecting object lens is rotatable with respect to the main body within a first angle. The light source is configured to produce a first light beam. The mask includes at least one transparent portion, and the first light beam passes through the transparent portion to be shaped.

In another embodiment, a second light beam emitted by an object passes through the reflecting object lens.

In yet another embodiment, the first light beam or the second light beam passes through the transparent portion to be shaped.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
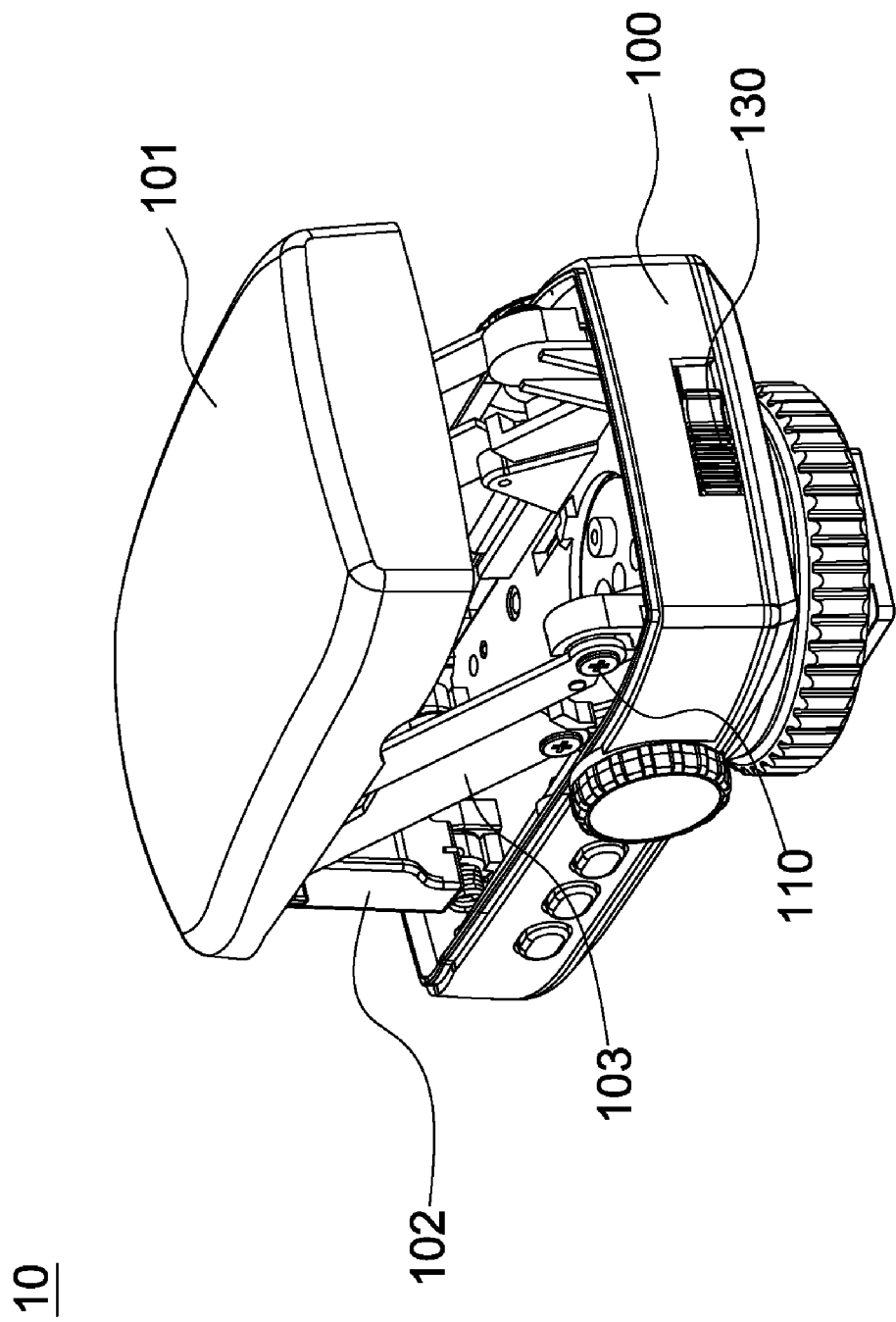
FIG. 1 is a schematic view of a prior optical apparatus.
Figure 2:
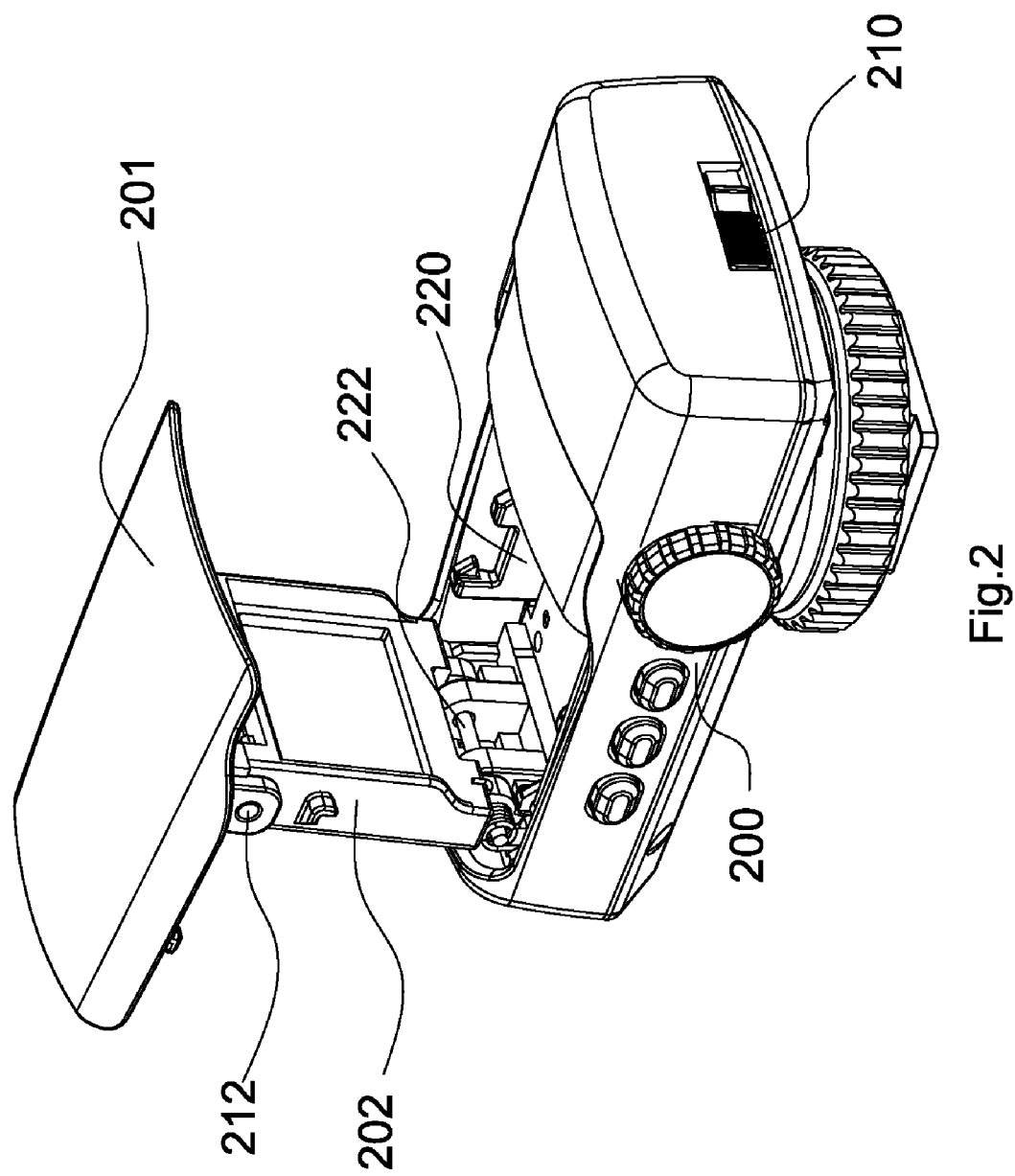
FIG. 2 is a schematic view of an optical apparatus in accordance with an embodiment of the invention.
Figure 3:
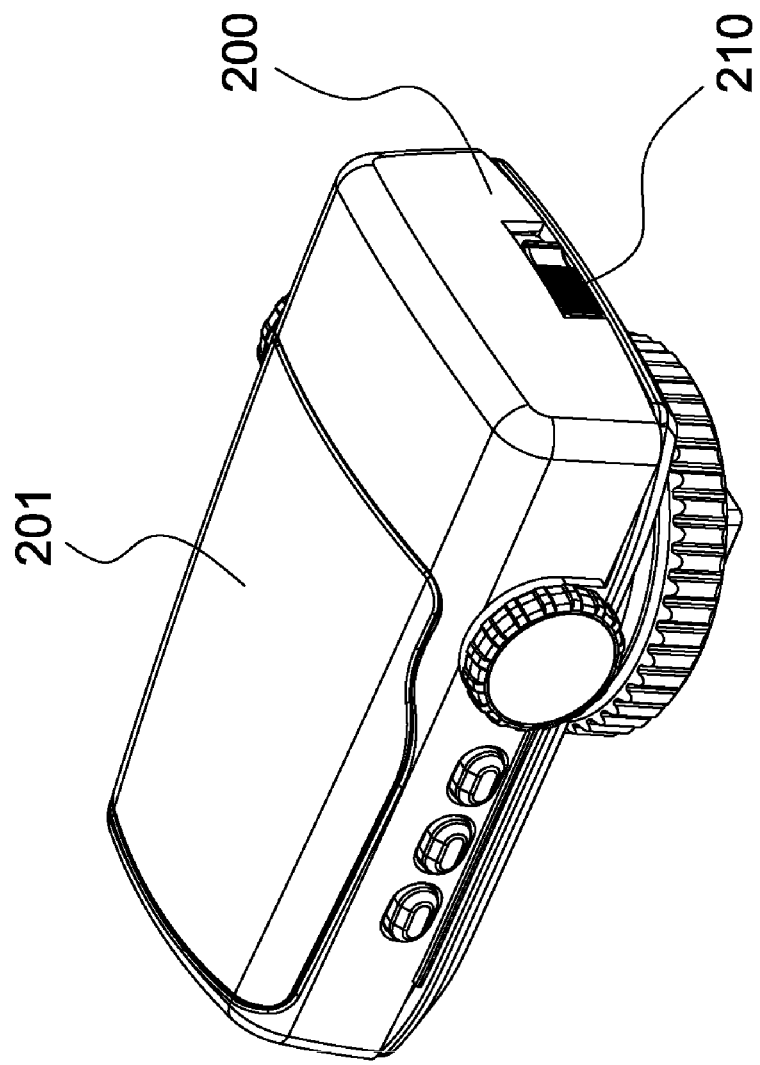
FIG. 3 is a schematic view of the optical apparatus of FIG. 2 in a closed state.

FIGS. 2-5 depict the structure of an optical apparatus in accordance with an embodiment of the invention. In the present embodiment, the optical apparatus 20 includes a cover 201, a reflecting object lens 202 and a main body 200. The reflecting object lens 202 is pivotally connected to the main body 200 through a first pivot 222 so that the reflecting object lens 202 is rotatable with respect to the main body 200 within a first angle. Similarly, the cover 201 is pivotally connected to the reflecting object lens 202 through a second pivot 212 so that the cover 201 is rotatable with respect to the reflecting object lens 202 within a second angle. The main body 200 includes a switch 210 disposed thereon. In operation, the switch 210 is toggled to raise the cover 201 and the reflecting object lens 202 so that the optical apparatus 20 comes to an opening state as shown in FIG. 2. To collapse the optical apparatus 20, the cover 201 is pushed down to the main body 200 for accommodating the reflecting object lens 202 in an enclosed space formed between the cover 201 and the main body 200, so that the optical apparatus 20 comes to a closed state as shown in FIG. 3.

Figure 4:
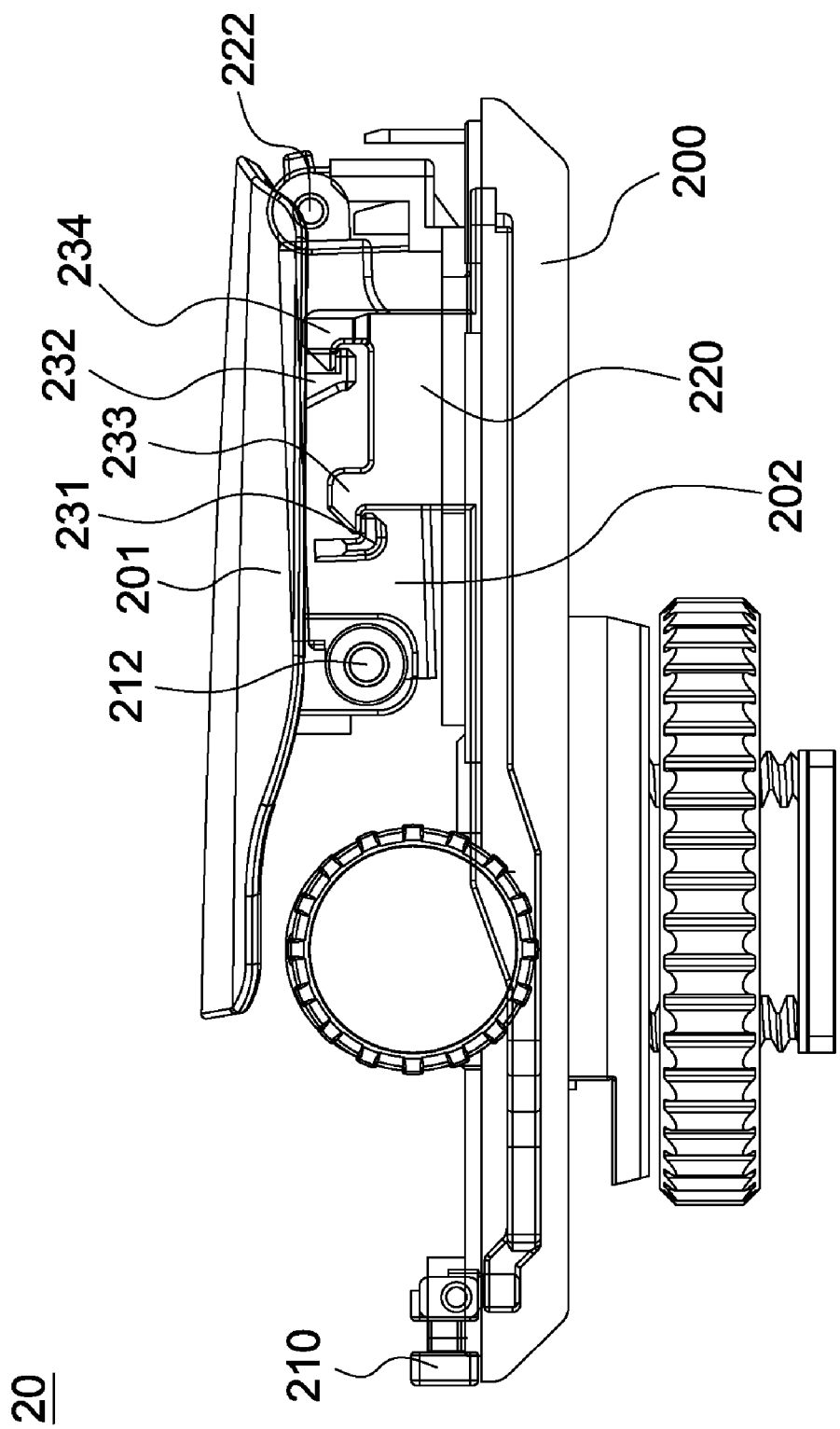
FIG. 4 is a side view of the optical apparatus of FIG. 3.
Figure 5:
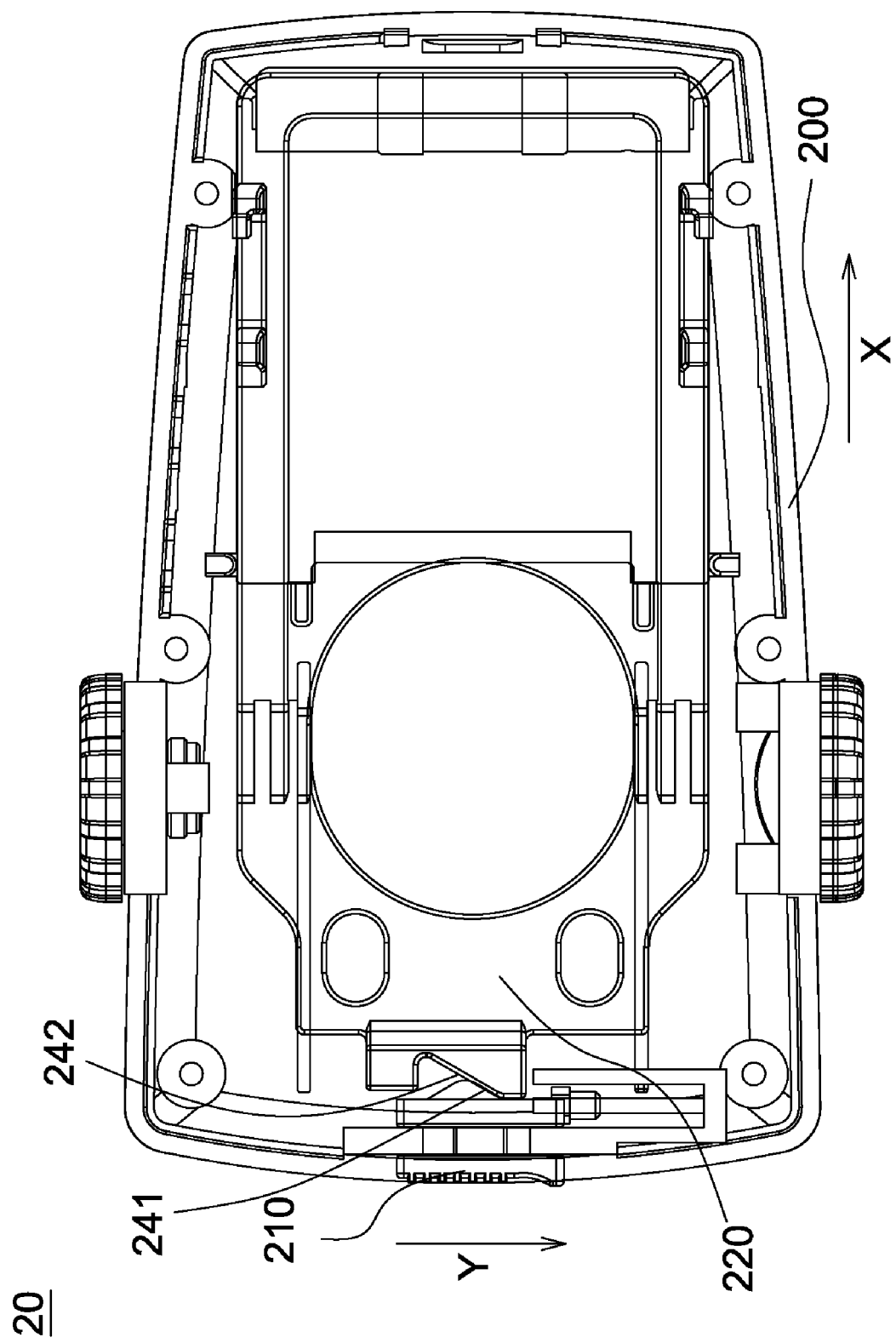
FIG. 5 is a top view of the optical apparatus of FIG. 3.
Figure 6:
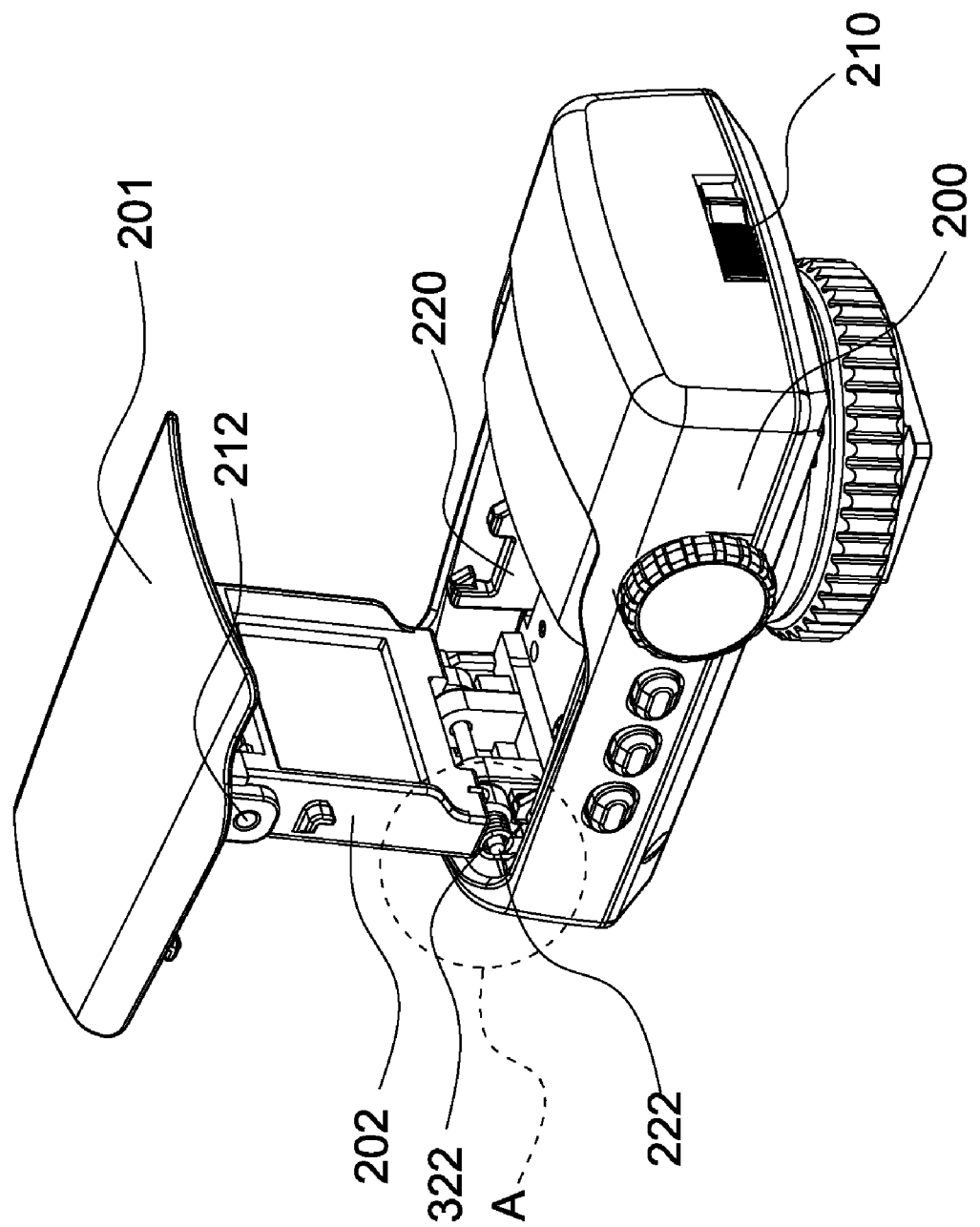
FIG. 6 is a schematic view of the optical apparatus of FIG. 3 in an opening state.
Figure 7:
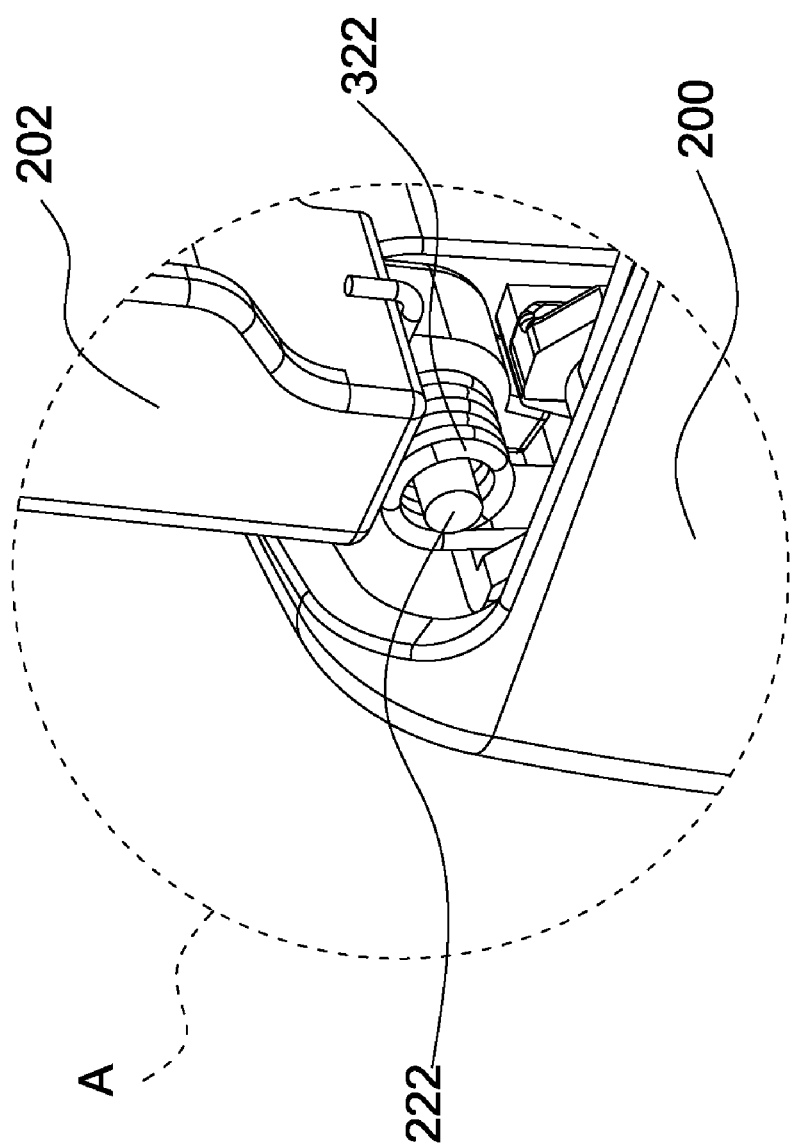
FIG. 7 is an enlargement view of part A in FIG. 6.
Figure 8:
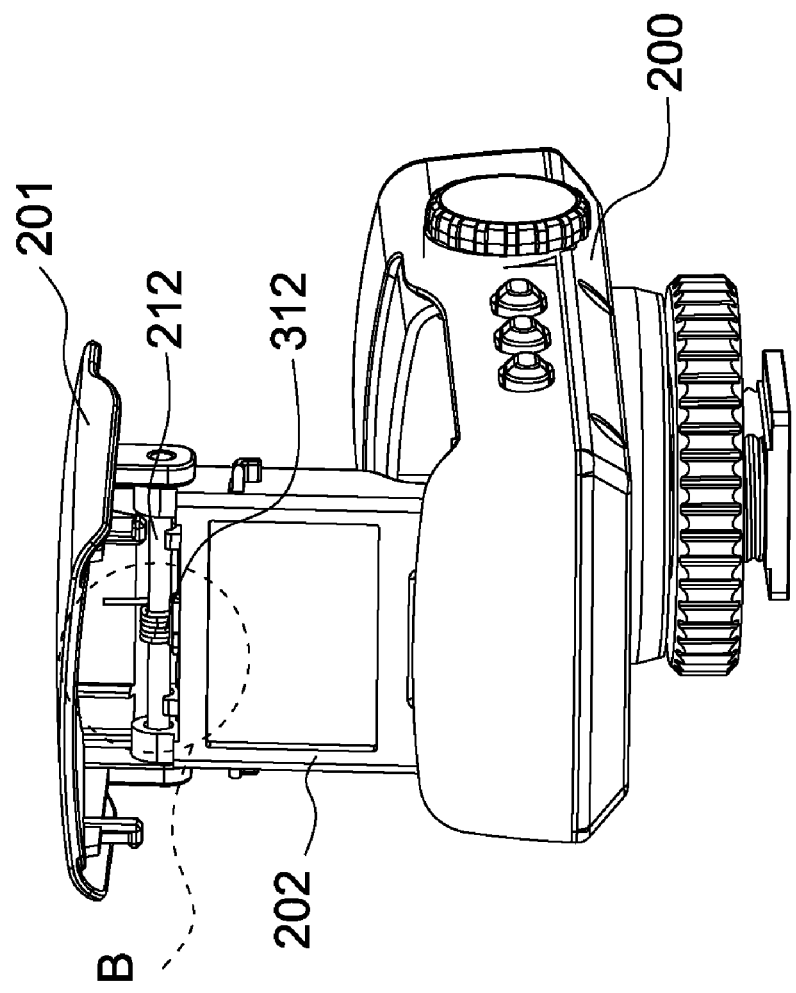
FIG. 8 is a rear view of the optical apparatus of FIG. 6.
Figure 9:
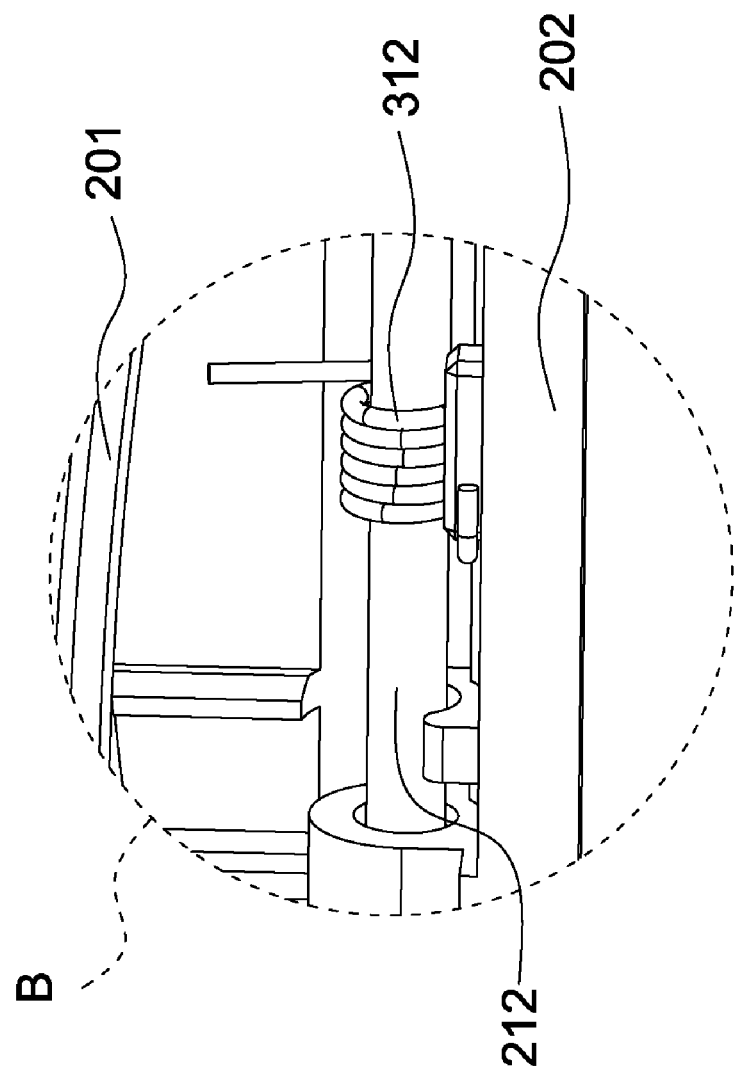
FIG. 9 is an enlargement view of part B in FIG. 8.

As shown in FIGS. 4 and 5, the main body 200 further includes a linkage structure 220 disposed therein. The linkage structure 220 includes a third hook 233 and a fourth hook 234. The reflecting object lens 202 includes a first hook 231, and the cover 201 includes a second hook 232. The first hook 231 is detachably connected to the third hook 233, and the second hook 232 is detachably connected to the fourth hook 234. The switch 210 includes a first inclined plane 241, and the linkage structure 220 includes a second inclined plane 242. The first inclined plane 241 is placed against the second inclined plane 242. The first hook 231 and the second hook 232 respectively engage with the third hook 233 and the fourth hook 234 so that the optical apparatus 20 comes to the closed state as shown in FIG. 4. When the switch 210 is toggled to move in a Y direction as shown in FIG. 5, the first inclined plane 241 is also moved in the Y direction. At the same time, the second inclined plane 242 is pushed by the first inclined plane 241 to move in an X direction so that the linkage structure 220 is moved in the X direction. Moreover, both the third hook 233 and the fourth hook 234 are moved in the X direction as the linkage structure 220 is moved. Thus, the first hook 231 and the second hook 232 are respectively detached from the third hook 233 and the fourth hook 234 so that both the reflecting object lens 202 and cover 201 are raised, and the optical apparatus 20 is opened.

As shown in FIGS. 6-9, the optical apparatus 20 further includes a first elastic element 322 and a second elastic element 312. In the present embodiment, both the first elastic element 322 and the second elastic element 312 are torsion springs. The first elastic element 322 is disposed on the first pivot 222. One end of the first elastic element 322 is placed against the main body 200, and the other end of the first elastic element 322 is placed against the reflecting object lens 202. The second elastic element 312 is disposed on the second pivot 212. One end of the second elastic element 312 is placed against the reflecting object lens 202, and the other end of the second elastic element 312 is placed against the cover 201. When the optical apparatus is closed, both the first elastic element 322 and the second elastic element 312 are compressed. As described above, when the switch 210 is toggled, the first hook 231 and the second hook 232 are respectively detached from the third hook 233 and the fourth hook 234. The compressed first elastic element 322 is released and pushes both the main body 200 and the reflecting object lens 202 so as to rotate the reflecting objective lens 202 with respect to the main body 200 at the first angle. Similarly, the compressed second elastic element 312 is released and pushes both the reflecting object lens 202 and the cover 201 so as to rotate the cover 201 with respect to the reflecting object lens 202 at the second angle.

In the present embodiment, although both the first elastic element 322 and the second elastic element 312 are torsion springs, it is understood that both the first elastic element 322 and the second elastic element 312 can be flat springs or other elastic elements.

In another embodiment, the first hook 231 and the third hook 233 are omitted. The linkage structure 220 is only provided with the fourth hook 234, and the cover 201 is provided with the second hook 232. When the optical apparatus 20 is closed, the second hook 232 is engaged with the fourth hook 234 so as to lock the reflecting object lens 202 and the cover 201. Other arrangement and operation of the optical apparatus of the present embodiment are similar to those of the above embodiment, and therefore the descriptions thereof are omitted.

Figure 10:
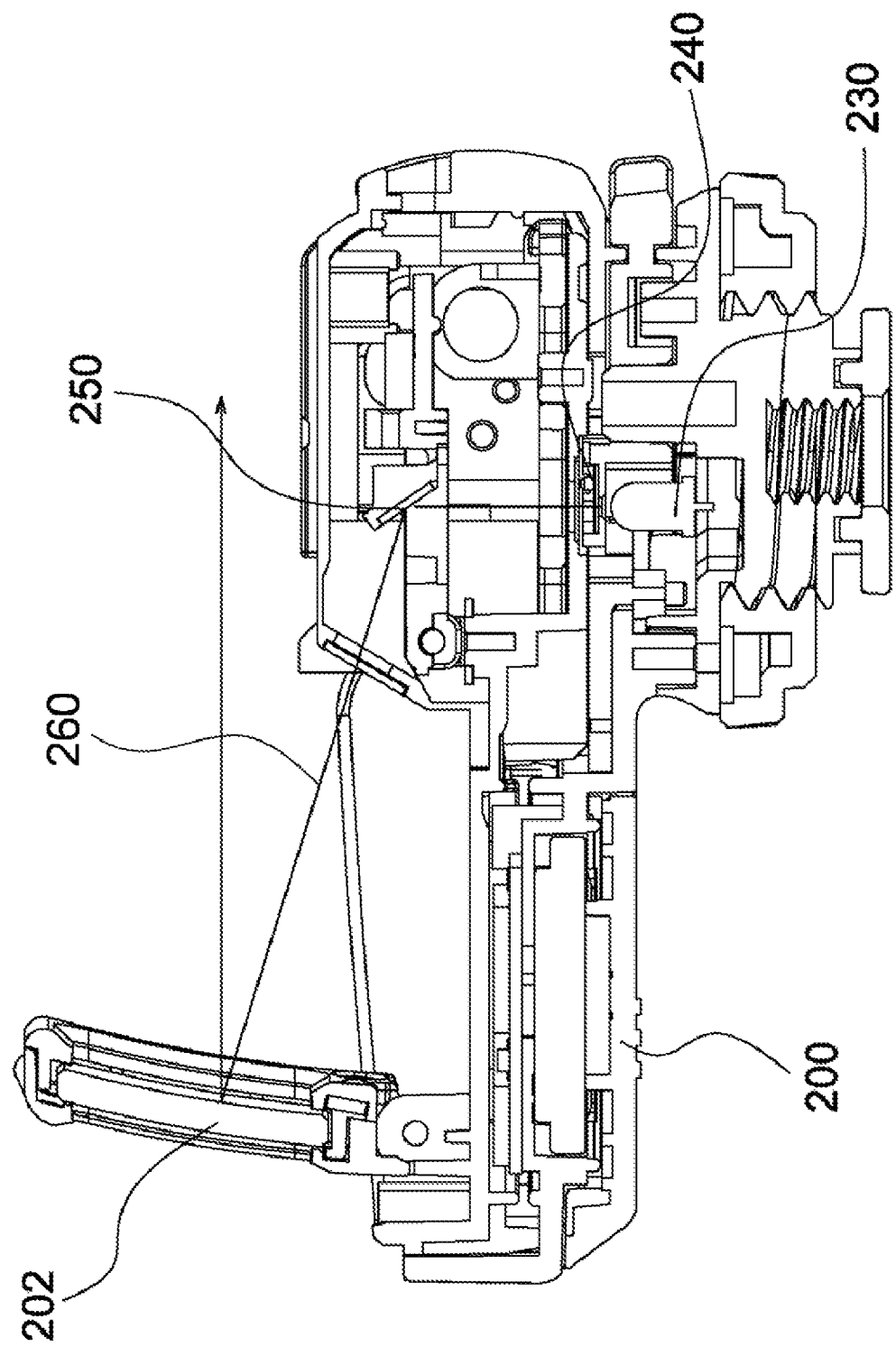
FIG. 10 depicts a light path of an optical apparatus in accordance with another embodiment of the invention.

FIG. 10 depicts a light path of the optical apparatus 20 in the opening state. The optical apparatus 20 further includes a light source 230, a mask 240 and a reflecting mirror 250. The light source 230, the mask 240 and the reflecting mirror 250 are disposed within the main body 200. The light source 230 is configured to emit a first light beam 260. The mask 240 includes at least one transparent portion and at least one opaque portion. When the first light beam 260 emitted by the light source 230 passes through the mask 240, the first light beam 260 is blocked by the opaque portion but passes through the transparent portion to be shaped (e.g. in the shape of a reticle, a crosshair, a target dot or a circle). The first light beam 260 which is shaped is reflected by the reflecting mirror 250 and the reflecting object lens 202 to the eyes of the user. Also, a second light beam (not shown) emitted by an object passes through the reflecting object lens 202 to be received by the eyes of the user. Thus, both the object and the shaped light beam are observed by the user through the optical apparatus 20. In the present embodiment, the light source 230 is a bi-colored light-emitting diode (LED), and the mask 240 includes four transparent portions with different shapes (a reticle, a crosshair, a target dot, and a circle) switched to generate different shaped light beams.

The cover is pivotally connected to the reflecting object lens through the pivot so that both the structure and the assembling procedure of the optical apparatus are simplified. Further, the manufacturing cost is reduced because the number of components of the optical apparatus is reduced.

What is claimed is:

1. An optical apparatus, comprising:
    a main body comprising a linkage structure, wherein the linkage structure comprises a first hook;
    a reflecting object lens pivotally connected to the main body, wherein the reflecting object lens is rotatable with respect to the main body within a first angle; and
    a cover pivotally connected to the reflecting object lens, wherein the cover is rotatable with respect to the reflecting object lens within a second angle.

2. The optical apparatus as claimed in claim 1, further comprising a pivot, wherein the reflecting object lens is pivotally connected to the main body through the pivot.

3. The optical apparatus as claimed in claim 1, further comprising a pivot, wherein the cover is pivotally connected to the reflecting object lens through the pivot.

4. The optical apparatus as claimed in claim 2, further comprising an elastic element disposed on the pivot, wherein the elastic element is deformed with an elastic force generated and stored therein when the optical apparatus is closed, and the elastic force is released when the optical apparatus is opened.

5. The optical apparatus as claimed in claim 4, wherein the elastic element is a torsion spring or a flat spring.

6. The optical apparatus as claimed in claim 3, further comprising an elastic element disposed on the pivot, wherein the elastic element is deformed with an elastic force generated and stored therein when the optical apparatus is closed, and the elastic force is released when the optical apparatus is opened.

7. The optical apparatus as claimed in claim 6, wherein the elastic element is a torsion spring or a flat spring.

8. The optical apparatus as claimed in claim 1, wherein the main body further comprises a switch;
wherein the switch comprises a first inclined plane;
wherein the linkage structure further comprises a second hook and a second inclined plane;
wherein the first inclined plane is placed against the second inclined plane;
wherein the first inclined plane slides with respect to the second inclined plane to move the linkage structure when the switch is operated.

9. The optical apparatus as claimed in claim 8, wherein the reflecting object lens further comprises a third hook configured to detachably connect to the first hook.

10. The optical apparatus as claimed in claim 8, wherein the cover further comprises a third hook configured to detachably connect to the second hook.

11. The optical apparatus, comprising:
a main body;
a reflecting object lens pivotally connected to the main body, wherein the reflecting object lens is rotatable with respect to the main body within a first angle;
a cover pivotally connected to the reflecting object lens, wherein the cover is rotatable with respect to the reflecting object lens within a second angle;
a light source; and
a reflecting mirror, wherein the light source is configured to produce a first light beam, and the reflecting mirror is configured to reflect the first light beam to the reflecting object lens.

12. The optical apparatus as claimed in claim 11, further comprising a mask, wherein the mask comprises at least one transparent portion, and the first light beam passes through the transparent portion to be shaped.

13. The optical apparatus as claimed in claim 11, further comprising a mask, wherein the mask comprises a plurality of transparent portions with different shapes, switched to generate different shaped light beams when the first light beam passes through the transparent portions to be shaped.

14. An optical apparatus, comprising:
a main body;
a reflecting object lens pivotally connected to the main body, wherein the reflecting object lens is rotatable with respect to the main body within a first angle;
a light source configured to produce a first light beam;
a mask comprising at least one transparent portion, wherein the first light beam passes through the transparent portion to be shaped; and
a reflecting mirror configured to reflect the first light beam to the reflecting object lens.

15. The optical apparatus as claimed in claim 14, wherein the main body comprises a switch and a linkage structure, the switch comprises a first inclined plane, the linkage structure comprises a first hook, a second hook and a second inclined plane, the first inclined plane is placed against the second inclined plane, and the first inclined plane slides with respect to the second inclined plane to move the linkage structure when the switch is operated.

16. The optical apparatus as claimed in claim 14, wherein a second light beam emitted by an object passes through the reflecting object lens.

17. The optical apparatus as claimed in claim 16, wherein the first light beam or the second light beam passes through the transparent portion to be shaped.

18. The optical apparatus as claimed in claim 17, wherein the transparent portion is in a shape of reticle, crosshair, target dot, or circle.

19. The optical apparatus as claimed in claim 14, further comprising a pivot, wherein the reflecting object lens is pivotally connected to the main body through the pivot.

20. The optical apparatus as claimed in claim 19, further comprising an elastic element disposed on the pivot, wherein the elastic element is deformed with an elastic force generated and stored therein when the optical apparatus is closed, and the elastic force is released when the optical apparatus is opened.

* * * * *